C. H. BISSELL.
ELECTRIC CONDUIT FITTING.
APPLICATION FILED FEB. 11, 1910.
1,174,809.
Patented Mar. 7, 1916.
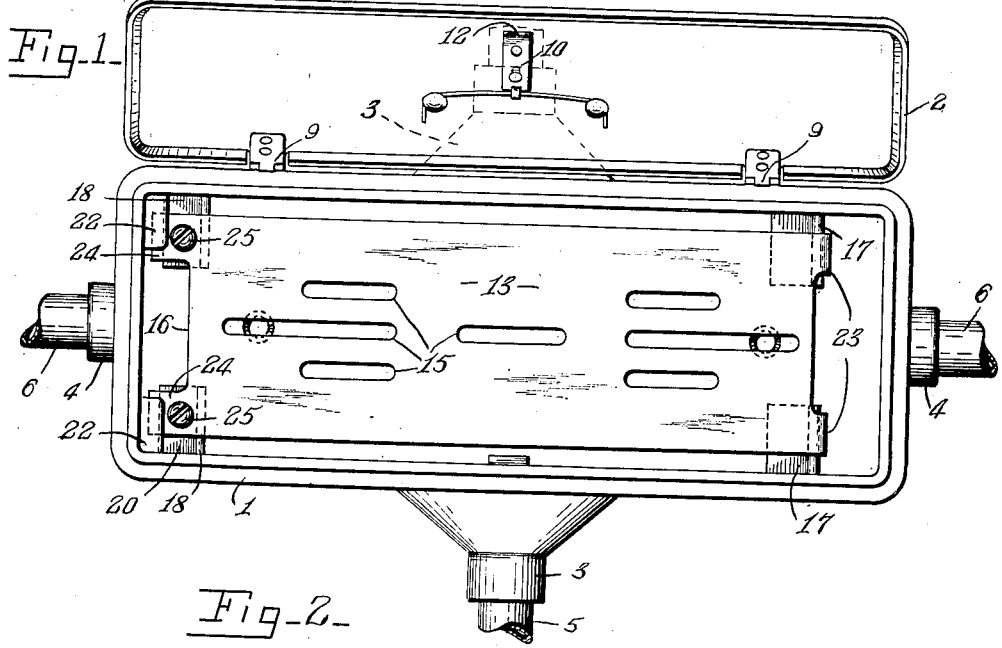
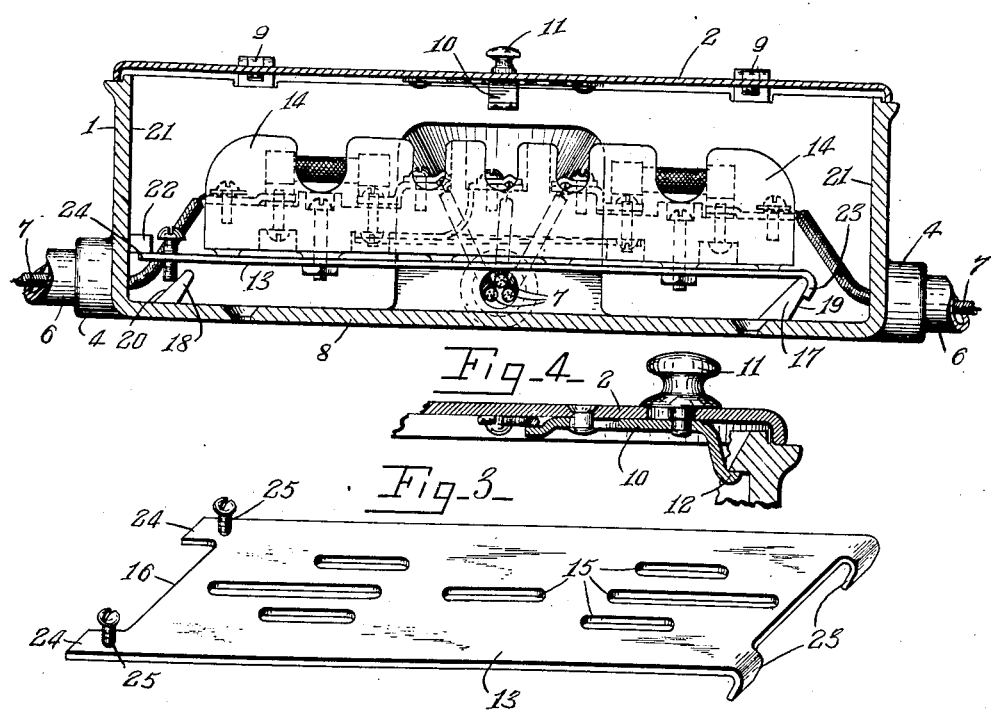
WITNESSES:
Chas H Young
T. Davis
INVENTOR.
Carl H Bissell
BY
Parsons Hall Bodell
ATTORNEYS.

UNITED STATES PATENT OFFICE.

CARL H. BISSELL, OF SYRACUSE, NEW YORK, ASSIGNOR TO CROUSE-HINDS COMPANY, OF SYRACUSE, NEW YORK, A CORPORATION OF NEW YORK.

ELECTRIC-CONDUIT FITTING.

1,174,809. Specification of Letters Patent. Patented Mar. 7, 1916.

Application filed February 11, 1910. Serial No. 543,310.

*To all whom it may concern:*

Be it known that I, CARL H. BISSELL, of Syracuse, in the county of Onondaga and State of New York, have invented a new and useful Electric-Conduit Fitting, of which the following is a specification.

My invention has for its object the production of an electric conduit fitting adapted to inclose electrical appliances such as fuse blocks, etc., and has for its object the production of means for securely and conveniently supporting such appliances and facilitating their removal and replacement and their ready connection to the electric wires in the conduits; and it consists in the combinations and structures hereinafter set forth and claimed.

In describing this invention, reference is had to the accompanying drawing in which like characters designate corresponding parts in all the views.

Figure 1 is a plan of my conduit fitting, the cover being illustrated in open position. Fig. 2 is a longitudinal sectional view of such fitting showing an electrical appliance, as a fuse block, mounted on the support therefor. Fig. 3 is an isometric view of the support. Fig. 4 is an enlarged sectional view illustrating the catch and contiguous parts.

1 is the body or box of my electric conduit fitting, such box being here shown as oblong and as having one longitudinal side open and provided with a closure 2. The body or box 1 is provided with one or more means as outwardly projecting nipples 3, 4 for connection with suitable conduits 5, 6 inclosing wires 7. The nipples 3 and 4 project laterally from angularly arranged sides of the body or box 1 with longitudinal portions thereof in the same general plane as the side 8 of the box opposed to the closure 2, and, preferably, the bases of the nipples 3 are formed funnel-shaped for facilitating deflecting of the wires passing through such nipples to the electrical appliance within the body or box. I have here shown the body or box 1 as provided with two nipples 3 and two nipples 4, but it is obvious that the body or box may be provided with any desirable number of nipples for connection to electric conduits, and that instead of said nipples, any other suitable means may be provided for connecting the body or box to the conduits.

The closure 2 is preferably connected to the body or box 1 at one longitudinal side by hinges 9 and is provided at its opposite side with means for securing the same to the body or box, such means being here illustrated as a spring-pressed sliding catch 10 mounted on the inner face of the closure 2, and provided with a finger piece 11 projecting through the closure beyond the outer face thereof, and also provided with an engaging portion 12 coacting with a shoulder on the interior of the body or box 1. It will be understood, however, that the sliding catch 10 forms no feature of my present invention.

13 is a support detachably mounted within the body or box 1 and adapted to carry an electrical appliance, as a fuse block 14, said support being provided with a number of lengthwise slots 15 for receiving suitable means, as bolts or screws, for securing the electrical appliance to the support. Preferably, the support 13 is of less width and length than the opening controlled by the closure 2 and is detachably secured within the body or box, thus permitting ready removal and replacement of the support and the electrical appliance carried thereby, and further, the support is spaced apart from the opposing side 8 of the body or box 1, and the axes of the nipples 3, 4, thus permitting the passage of wires between the support and the side 8, and end edges of the support are spaced apart from the opposing sides of the body or box 1 for permitting the electric wires to be passed between said end edges and the opposing sides of the box from the nipples to the electrical appliance, one end of the support 13 being preferably provided with a cutout 16 for facilitating the passage of wires to the appliance 14.

In the illustrated construction of my invention, the side 8 of the box is provided at one end with a pair of lugs or projections 17 arranged on opposite sides of the longitudinal intermediate portion of the box and is provided at its opposite end with a similarly arranged pair of lugs or projections 18 of less height than the lugs or projections 17, said lugs or projections 17, 18 having surfaces 19, 20 thereof opposed to the sides 21 of the box inclined relatively to said sides 21, and to the general plane of the support 13, and one of said sides 21 is provided with a pair of lugs or projections 22 arranged on opposite sides of said intermediate portion of the body or box and having their surfaces opposed to the side 8 extending in the same general plane as the support 13.

Preferably, one end of the support 13 is provided with hook-shaped extensions 23 projecting toward the side 8 of the body or box 1, and having angularly arranged surfaces coacting with the upper ends and inclined surfaces 19 of the lugs or projections 17, surfaces of the extensions 23 being parallel to the surfaces 19, and the other end of said support is provided with extensions 24 at opposite sides of the cutout 16, which extend in the same general plane as the main portion of the support and between the wall 8 and the lugs or projections 22, and are provided with surfaces parallel with and coacting with the opposing surfaces of said projections. In placing the support 13 in position it is arranged in the body or box 1 substantially parallel to the side 8 with the extensions 23 to the right of the lugs or projections 17 and is then moved rectilinearly endwise, thus engaging the extensions 23 with the inclined surfaces 19 of the lugs or projections 17 and moving the extensions 24 beneath the lugs or projections 22.

The support 13 is provided with locking members 25 which preferably extend through the extensions 24 of said support and coact with the inclined surfaces 20 of the lugs or projections 18. As the members or screws 25 are moved longitudinally toward the wall 8, or in a direction at an angle to the rectilinear movement of the support 13 into and out of engagement with the lugs or projections 17, 18, said members or screws 25 coact with the inclined surfaces 20 of the lugs or projections 18 and move the support 13 endwise to the left and firmly hold the support in position, with one side of one end thereof detachably engaging and interlocking with lugs or projections extending from one side of the body or box 1, and the opposite side of the other end of said support detachably engaging and interlocking with lugs or projections extending from an angularly arranged side of said body. By moving the members or screws 25 in the reverse direction, the support 13 may be readily detached from the lugs coacting with the extensions 23 and 24 of such support, whereupon the support and the appliance carried thereby may be easily removed from the body or box 1.

What I claim is:—

1. In an electric conduit fitting and in combination, a box having an opening through one side thereof, a support located in the box on the side thereof opposite the opening, the support being movable into the box through the opening, rigid interlocking engaging parts on the box and the support, and means for moving the support at an angle to its direction of movement into and out of opening of the box for bringing said parts on the support and box into engagement, and for permitting the disengagement thereof, said means including a movable part arranged to be operated through said opening, substantially as and for the purpose described.

2. In an electric conduit and in combination, a box having an opening through one side thereof, a support located in the box and movable into the box through said opening, rigid engaging parts on the box and the support and arranged to be interlocked by a movement of the support in a direction at an angle to its movement into the box through said opening, and means including parts associated with the box and with the support and located near one end of the support for drawing the support endwise to engage said interlocking parts, said means being arranged to be operated through the opening of the box, substantially as and for the purpose specified.

3. In an electric conduit and in combination, a box having an opening through one side thereof, a support located in the box and movable into the box through said opening, rigid engaging parts on the box and the support and arranged to be interlocked by a movement of the support in a direction at an angle to its movement into the box through said opening, means including parts associated with the box and with the support and located near one end of the support for drawing the support endwise to engage said interlocking parts, said means being arranged to be operated through the opening of the box, and including a fixed member carried by the box and formed with an inclined face and a screw carried by the support and having its head toward said opening, the screw engaging the inclined face of the fixed member, substantially as and for the purpose set forth.

4. In an electric conduit fitting and in combination, a box having an opening, a support located in the box and movable into the box through said opening, engaging parts associated with the box and the support, and movable into and out of engagement by a movement of the support in a direction at an angle to the direction of its movement into the box, and means for effecting the engagement and disengagement of the interlocking parts including an operating member movable in the same general direction as the movement of the support into the box and being arranged to be operated through the opening of the box, substantially as and for the purpose described.

5. In an electric conduit fitting and in combination, a box having an opening, a support located in the box and movable into the box through said opening, interlocking parts at opposite ends of the support and on the box in position to be interlocked by a movement of the support in the direction at an angle to its movement into and out of the box through the opening, the interlocking part of the box at one end of the support being arranged to overlie the contiguous interlocking part on the support and being located on the upper side of the support toward the opening of the box, and the interlocking part of the box located near the opposite end of the support being arranged beneath the support, the coacting interlocking part of the support being shaped to extend under the latter interlocking part on the box, and means for moving the support in a direction at an angle to its movement into and out of the box, substantially as and for the purpose specified.

6. In an electric conduit fitting and in combination, a box having an opening, a support located in the box and movable into the box through said opening, interlocking parts at opposite ends of the support located on the box and on the support in position to be interlocked by a movement of the support in a direction at an angle to its movement into and out of the box through the opening, the interlocking part on the box at one end of the support being arranged to overlie the adjacent part on the support and being located on the upper side of the support toward the opening of the box, and the interlocking part of the box on the opposite end of the support being arranged beneath the support, and the coacting interlocking parts of the support being shaped to extend under the latter interlocking parts on the box, and means for moving the support in a direction at an angle to its movement into and out of the box, said means including a member movable in a direction at an angle to the movement of the support when engaging the interlocking parts, the movable member being arranged to be operable through the opening of the box, substantially as and for the purpose set forth.

7. In an electric conduit fitting and in combination, a box having an opening, a support located in the box and movable into the box through said opening, interlocking parts at opposite ends of the support located on the box and on the support and in position to be interlocked by a movement of the support in the direction at an angle to its movement into and out of the box through the opening, the interlocking part of the box at one end of the support being arranged to overlie the adjacent interlocking part on the support and being located on the upper side of the support toward the opening of the box, and the interlocking part of the box on the opposite end of the support being arranged beneath the support, and the coacting interlocking part of the support being shaped to extend under the latter interlocking part on the box, and means for moving the support in a direction at an angle to its movement into and out of the box, the engaging interlocking part at one end of the support having faces arranged at an inclined angle to the direction of movement of the support by the support-moving means whereby said part formed with the inclined face has a tightening action during the movement of the support by its moving means, substantially as and for the purpose described.

8. In an electric conduit fitting and in combination, a box having an opening and having means for connection with a conduit, a support located in the box having its major portion arranged substantially parallel to the bottom of the box and spaced therefrom, a projection on the box having an engaging surface extending obliquely to the face of the major portion of the support, a projection on the box at the other end of the support having an engaging surface extending substantially parallel to the face of the major portion of the support, the support also having a projection arranged to extend under the oblique projection of the box and also the support having a projection to extend horizontally under the horizontal projection of the box, a part on the box having an engaging surface extending in a direction substantially parallel to the engaging surface of the first-named projection, and a member carried by the support, movable at an angle to the face of the major portion of the support and engaging with said engaging surface of said part for moving the support in an edgewise direction and interlocking the projections and causing the projection having the oblique face to have a downwardly tightening action on the projection of the support coacting therewith, substantially as and for the purpose specified.

9. The combination in an electric conduit fitting, a box having an opening in one side thereof, a supporting plate movable into the box through the opening and having a hook shaped portion at one end and a substantially straight portion at its other end, the box having projections arranged to overlie the straight portions of the plate, and also a projection arranged to be engaged by the hook shaped portion of the plate when the plate is moved edgewisely, an abutment in the box having an inclined surface facing the opening of the box and in the direction of the edgewise movement of the plate to interlock the straight and hook shaped portions thereof with the projections of the box, and a member movable through the plate and coacting with said inclined surface of the abutment to draw the plate endwisely and interlock the hook shaped and straight portions thereof with the coacting projections of the box, substantially as and for the purpose set forth.

10. The combination of an electric conduit fitting including a box having an opening and means for connection with a conduit, the box also having internal engaging means spaced apart, a support for an electrical appliance within the box, the support having surfaces arranged at an angle to each other for coacting with one of said engaging means and having a surface extending in the direction of the general plane of the support for coacting with the other of said engaging means, and means for moving the support in its general plane for forcing the surfaces of the support into engagement with the engaging means of the box, substantially as and for the purpose specified.

11. The combination of an electric conduit fitting including a box having an opening and means for connection with a conduit, the box also having internal engaging means spaced apart, a support for an electrical appliance within the box, the support having surfaces arranged at an angle to each other for coacting with one of said engaging means and having a surface extending in the direction of the general plane of the support for coacting with the other of said engaging means, the latter surface and the angularly arranged surfaces being located on opposite sides of the support, and means for moving the support in its general plane for forcing the surfaces of the support into engagement with the engaging means of the box, substantially as and for the purpose described.

12. The combination of an electric conduit fitting including a box having an opening and means for connection with a conduit, a support and means for moving the support edgewisely for moving the support into interlocking engagement with the means on the angularly arranged side of the box for an electrical appliance within the box, the box having angularly arranged sides thereof provided with means interlocking with the support, substantially as and for the purpose described.

13. The combination of an electric conduit fitting including a box having an opening and means for connection with a conduit, a support for an electrical appliance within the box, the support being opposed to one of the sides of the box and spaced apart therefrom, and the box having a projection on said side thereof for engaging one side of the support and having a projection on an angularly arranged side for engaging the opposite side of the support, and means for moving the support edgewisely for engaging the support with the projections of the box, substantially as and for the purpose set forth.

14. The combination of an electric conduit fitting including a box having an opening, and a support for an electrical appliance within the box, the box having a plurality of means spaced apart and interlocking with one side of one end of the support, and a plurality of means spaced apart and interlocking with the opposite side of the other end of said support, means for effecting interlocking engagement between said means and support, and the box having hollow nipples for connection with a conduit, the passage of the nipples opening into the box between said plurality of interlocking means spaced apart, substantially as and for the purpose specified.

15. The combination of an electric conduit fitting including a box having an opening and means for connection with a conduit, and a support for an electrical appliance within the box, the support being opposed to one of the sides of the box and spaced apart therefrom, and the box having said side thereof provided with a plurality of projections spaced apart and arranged at opposite sides of the intermediate portion of the box and interlocking with one side of one end of the support, coacting surfaces of said projections and the support being arranged at an angle to the general plane of the support, said box having an angularly arranged side thereof provided with a plurality of projections spaced apart and arranged at opposite sides of said intermediate portion of the box and interlocking with the opposite side of the other end of said support, coacting surfaces of the last-mentioned projections and the support being arranged substantially parallel to the general plane of the support and means for holding the support in interlocking engagement with said projections on the box, substantially as and for the purpose set forth.

16. The combination of an electric conduit fitting including a box having an opening and means for connection with a conduit, the box also having internal lugs spaced apart, and a support for an electrical appliance within the box, the support having hook-shaped means for engaging one of the lugs, means spaced apart from said hook-shaped means for extending under the other of said lugs, and means for maintaining the lug engaging parts of the support in engagement, substantially as and for the purpose specified.

17. The combination of an electric conduit fitting including a box having an opening and means for connection with a conduit, the box also having internal lugs spaced apart, a support for an electrical appliance within the box, the support having hook-shaped means at one end for hooking over one of the lugs, and means at its other end for extending under and interlocking with the other of said lugs, the support being movable rectilinearly endwise for engaging the hook-shaped means and interlocking means with the lugs, and a means for holding the support with its said means in engagement substantially as and for the purpose set forth.

18. The combination of an electric conduit fitting including a box having an opening and means for connection with a conduit, the box having a plurality of pairs of internal lugs, the lugs of each pair being arranged at opposite sides of the intermediate portion of the box, the pairs of lugs being spaced apart from each other, and a plurality of said pairs being provided on one side of the box, and one of said pairs being provided on a side of the box arranged at an angle to the first-mentioned side thereof, a support for an electrical appliance within the box, the support being opposed, to the side of the box provided with a plurality of the pairs of lugs and having at one end hook-shaped extensions coacting with one pair of lugs on the opposing side of the box, said support having at its other end a plurality of extensions projecting in the same general plane as the main portion of the support and coacting with the lugs on the angularly arranged side of the box, and screws movable through the last-mentioned extensions of the support and coacting with another pair of the lugs on the side of the box opposed to the support, substantially as and for the purpose specified.

19. The combination of an electric conduit fitting including a box having an opening and means for connection with a conduit, the box also having internal lugs spaced apart, and an inclined surface facing one of the lugs, a support for an electrical appliance within the box, the support having means spaced apart for interlocking with the lugs, and the support being movable rectilinearly for engaging the last-mentioned means and the lugs, and a screw extending through the support and coacting with the inclined surface, substantially as and for the purpose described.

20. The combination of an electric conduit fitting including a box having an opening and means for connection with a conduit, the box having a plurality of pairs of internal lugs, the lugs of each pair being arranged at opposite sides of the intermediate portion of the box, and a plurality of said pairs being provided on one side of the box and having surfaces opposed to the angularly arranged sides of the box and inclined relatively to said sides, and one of said pairs of lugs being provided on one of said angularly arranged sides of the box and having engaging surfaces substantially parallel to the side of the box provided with said plurality of pairs of lugs, a support for an electrical appliance within the box, the support being opposed to the side of the box provided with said plurality of pairs of lugs and having at one end hook-shaped extensions coacting with the inclined surfaces of one pair of the lugs on the opposing side of the box, said support having at its other end a plurality of extensions projecting in the same general plane as the main portion of the support and coacting with the engaging surfaces of the pair of lugs on the angularly arranged side of the box, and screws movable through the last-mentioned extensions of the support and coacting with the inclined surfaces of another pair of the lugs on the side of the box opposed to the support, substantially as and for the purpose set forth.

In testimony whereof, I have hereunto signed my name in the presence of two attesting witnesses, at Syracuse, in the county of Onondaga, in the State of New York, this 9th day of February, 1910.

CARL H. BISSELL.

Witnesses:
C. C. SCHOENECK,
S. B. VAN RANST.

It is hereby certified that in Letters Patent No. 1,174,809, granted March 7, 1916, upon the application of Carl H. Bissell, of Syracuse, New York, for an improvement in "Electric-Conduit Fittings," errors appear in the printed specification requiring correction as follows: Page 4, line 43, claim 12, after the word "support" strike out all to and including the word "box," line 47; same page and claim, line 50 as now numbered, after the word "support" insert the words *and means for moving the support edgewisely for moving the support into interlocking engagement with the means on the angularly arranged side of the box;* and that the said Letters Patent should be read with these corrections therein that the same may conform to the record of the case in the Patent Office.

Signed and sealed this 9th day of October, A. D., 1917.

[SEAL.]

F. W. H. CLAY,

*Acting Commissioner of Patents.*

Cl. 247—12.